(No Model.)  2 Sheets—Sheet 1.

F. G. KOEHLER.
CAR BRAKE.

No. 600,081. Patented Mar. 1, 1898.

Attest:
N. T. Smith
A. J. McCauley

Inventor:—
Frank G. Koehler:—
By Higdon, Longan, & Higdon
Attys.

THE NORRIS PETERS CO., PHOTO-LITHO., WASHINGTON, D. C.

(No Model.) 2 Sheets—Sheet 2.
F. G. KOEHLER.
CAR BRAKE.
No. 600,081. Patented Mar. 1, 1898.
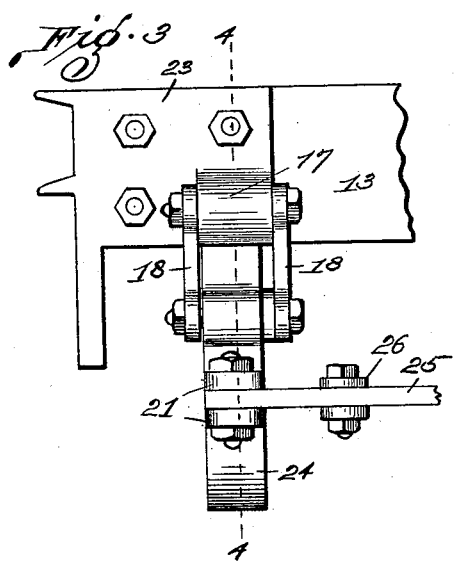
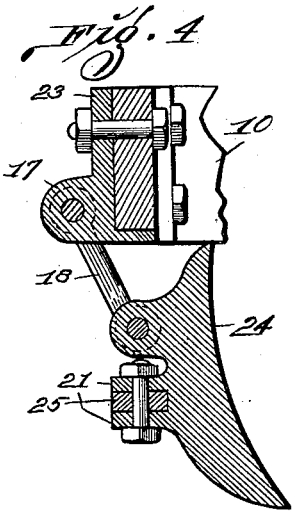
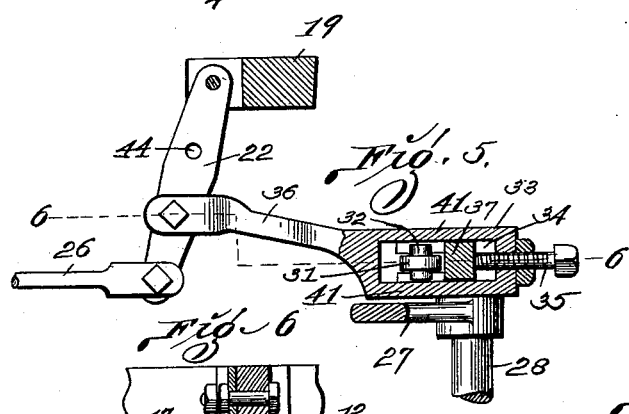
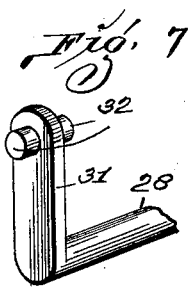
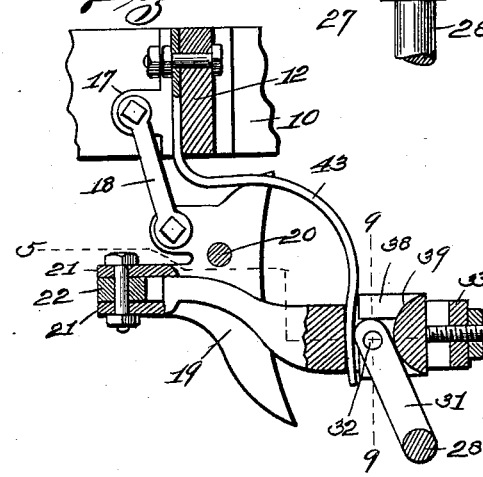
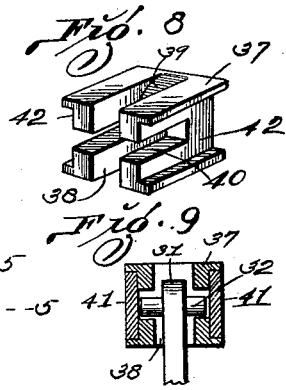
Attest:
W. F. Smith
A. J. McBauley
Inventor:—
Frank G. Koehler:—
By Higdon, Longan & Higdon
Attys.

UNITED STATES PATENT OFFICE.

FRANK G. KOEHLER, OF ST. LOUIS, MISSOURI, ASSIGNOR TO THE LACLEDE CAR COMPANY, OF SAME PLACE.

CAR-BRAKE.

SPECIFICATION forming part of Letters Patent No. 600,081, dated March 1, 1898.

Application filed June 24, 1897. Serial No. 642,173. (No model.)

*To all whom it may concern:*

Be it known that I, FRANK G. KOEHLER, of the city of St. Louis, State of Missouri, have invented certain new and useful Improvements in Car-Brakes, of which the following is a full, clear, and exact description, reference being had to the accompanying drawings, forming a part hereof.

My invention relates to car-brakes; and it consists of the novel construction, combination, and arrangement of parts hereinafter shown, described, and claimed.

Figure 1:
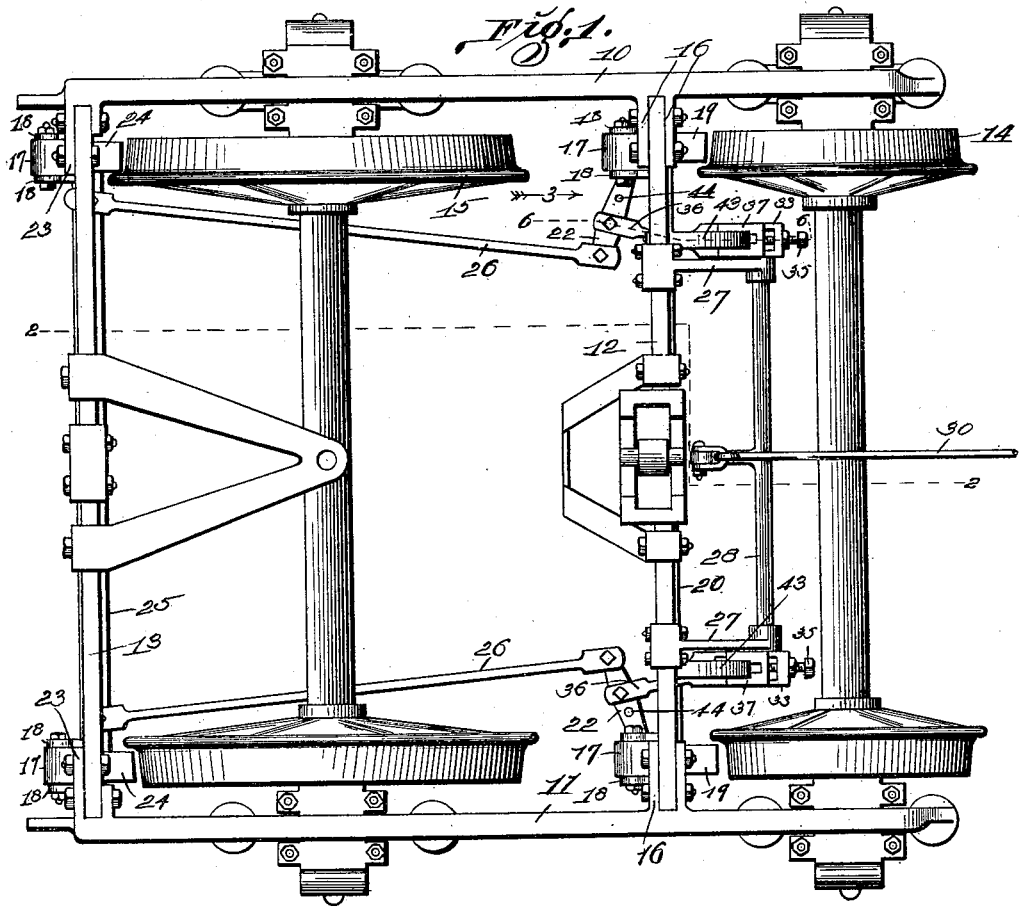
Figure 2:
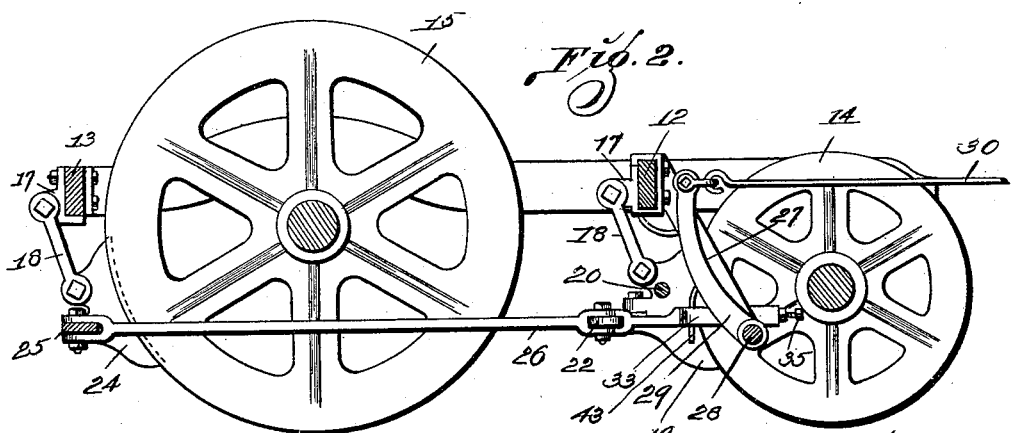

Figure 1 is a top plan view of a truck, showing my improved brake in position for use. Fig. 2 is a vertical longitudinal section taken approximately on the line 2 2 of Fig. 1. Fig. 3 is a view in elévation of the parts seen looking in the direction indicated by the arrow 3 in Fig. 1, parts being broken away to economize space. Fig. 4 is a vertical section taken approximately on the line 4 4 of Fig. 3. Fig. 5 is a horizontal section taken approximately on the line 5 5 of Fig. 6. Fig. 6 is a vertical section taken approximately on the line 6 6 of Figs. 1 or 5. Fig. 7 is a view in perspective of the end of a rock-shaft which I employ. Fig. 8 is a view in perspective of a sliding block which I employ in adjusting the brake. Fig. 9 is a vertical transverse section taken approximately on the line 9 9 of Fig. 6.

Referring by numerals to the drawings, the side bars 10 and 11 are connected by the cross-bars 12 and 13. The cross-bar 12 is located immediately in front of the small wheels 14, and the cross-bar 13 is located immediately in front of the large wheels 15. The cross-bar 12 is rectangular in cross-section and its ends are placed between the pairs of lugs 16, projecting inwardly from the side bars 10 and 11, and said ends are secured in position by means of bolts inserted through the lugs and through the cross-bar. The lugs 16 are connected at their lower edges, thus forming shelves to support the cross-bar 12. Projecting inwardly from the lugs 16 are ears 17, said ears being in alinement with the peripheries of the wheels. The connecting-rods 18 are placed one on each side of the ears 17 and pivotally attached to said ears by means of a bolt. The brake-shoes 19 are placed between the lower ends of the connecting-rods 18 and pivotally attached to said connecting-rods by means of a bolt, thus forming pivotal supports for the brake-shoes. The brake-shoes 19 are connected by the rod 20, and said brake-shoes are in position to engage the small wheels 14. A pair of vertical perforated ears 21 projects forwardly from each of the brake-shoes 19, and a lever 22 is placed between said ears 21 and secured in position by a bolt.

The cross-bar 13 is similar in construction to the cross-bar 12. Lugs 23 project inwardly from the forward ends of the side bars 10 and 11, and the cross-bar 13 is secured to said lugs by bolts. The brake-shoes 24 are secured to the lug 23 in the same manner that the brake-shoes are secured to the lugs 16. A pair of ears similar to the ears 21 extend forwardly from the brake-shoes 24, and the bar 25 connects the ears of one brake-shoe 24 with the ears of the other brake-shoe 24. The connecting-rods 26 connect the bar 25 with the inner ends of the levers 22. The arms 27 extend backwardly and downwardly from the cross-bar 12, and the rock-shaft 28 is mounted in bearings in the lower ends of said arms 27.

The arm 29 extends upwardly from the rock-shaft 28, and the connecting-rod 30 connects the upper end of the arm 29 with the brake-operating mechanism. The crank-arms 31 extend upwardly from the ends of the rock-shaft 28, and the pins 32 are inserted through and rigidly fixed in the upper ends of the crank-arms 31, as shown in Fig. 7.

The blocks 33 have rectangular vertical openings 34, and the adjusting-screws 35 are inserted through the rear sides of the blocks into the openings 34. The arms 36 connect the blocks 33 with the levers 22 at points intermediate of the ends of said levers. The sliding blocks 37 (shown in Fig. 8) are substantially cubical in outline and have vertical slots 38 formed from their forward faces to receive the upper ends of the crank-arms 31. The rear faces 39, formed by the slots 38, are semicircular, as shown in Fig. 6, said faces 39 engaging the rear sides and upper ends of the crank-arms 31. The horizontal slots 40 are formed from the forward sides of the blocks 37 to receive the pins 32, and the blocks 37 are inserted in the openings 34, and the side bars 41 of the blocks 33 operate in the recesses 42, formed in the side faces of the blocks 37, and the adjusting-screws 35 engage the rear faces of said blocks 37, thus forming an adjustable sliding connection between the blocks 37 and the blocks 33 and a connection between the rock-shaft 28 and the levers 22, whereby said levers are operated by the operation of the rock-shaft.

The kick-springs 43 are attached to the cross-bar 12 and extend downwardly into the openings 34 in front of the blocks 37, the tension of said springs being exerted against the faces forming the forward ends of said openings 34, as required to throw the brake-shoes away from the wheels.

A series of openings 44 may be formed through the levers 22, as a means of adjusting the connection between said levers 22 and the blocks 33, as required to increase or decrease the relative leverage between the brake-shoes 19 and the brake-shoes 24. When the connecting-rod 30 is operated by the brake-operating mechanism to pull the upper end of the arm 29 backwardly, the upper ends of the crank-arms 31 will swing backwardly, thus pulling backwardly on the arms 36 and pulling the brake-shoes toward the wheels. When the brake-operating mechanism is released, the kick-springs 43 throw the brake-shoes away from the wheels.

I claim—

1. In a car-brake, brake-shoes mounted to swing adjacent to the wheels and in transverse alinement, bars connecting said brake-shoes, connecting-rods attached to said bars and extending backwardly, a second set of brake-shoes mounted to swing adjacent to the second set of car-wheels, levers pivotally connected to said second set of brake-shoes and extending inwardly and attached to the rear ends of said connecting-rods and means attached to said levers at points intermediate of their ends whereby said levers are operated, substantially as specified.

2. In a car-brake, a pair of brake-shoes mounted to swing adjacent to a pair of car-wheels, levers pivotally attached to said brake-shoes and extending inwardly, means of resisting the swing of the inner ends of said levers, a rock-shaft, crank-arms projecting from said rock-shaft and connections between the outer ends of said crank-arms and said levers at points intermediate of their ends whereby the brake-shoes are operated by the operation of the rock-shaft, substantially as specified.

3. In a car-brake, brake-shoes mounted to swing adjacent to the wheels and in transverse alinement, bars connecting said brake-shoes, connecting-rods attached to said bars and extending backwardly, a second set of brake-shoes mounted to swing adjacent to the second set of car-wheels, levers pivotally connected to said second set of brake-shoes and extending inwardly and attached to the rear ends of said connecting-rods, a rock-shaft, crank-arms projecting from said rock-shaft, connections between the outer ends of said crank-arms and said levers at points intermediate of their ends, and means of operating said rock-shaft, substantially as specified.

4. In a car-brake, brake-shoes mounted to swing adjacent to the wheels and in transverse alinement, bars connecting said brake-shoes, connecting-rods attached to said bars and extending backwardly, a second set of brake-shoes mounted to swing adjacent to the second set of car-wheels, levers pivotally connected to said second set of brake-shoes and extending inwardly and attached to the rear ends of said connecting-rods, a rock-shaft, crank-arms projecting from said rock-shaft, connections between the outer ends of said crank-arms and said levers at points intermediate of their ends, means of operating said rock-shaft, and springs operating to throw the brake-shoes away from the wheels, substantially as specified.

5. In a car-brake, brake-shoes mounted to swing adjacent to the wheels and in transverse alinement, bars connecting said brake-shoes, connecting-rods attached to said bars and extending backwardly, a second set of brake-shoes mounted to swing adjacent to the second set of car-wheels, levers pivotally connected to said second set of brake-shoes and extending inwardly and attached to the rear ends of said connecting-rods, arms pivotally attached to said levers at points intermediate of their ends, a rock-shaft, crank-arms projecting from said rock-shaft, means of forming adjustable connections between the outer ends of said crank-arms and said arms, means of operating said rock-shaft, and yielding mechanism operating to throw the brake-shoes away from the wheels, substantially as specified.

In testimony whereof I affix my signature in presence of two witnesses.

FRANK G. KOEHLER.

Witnesses:
   EDWARD E. LONGAN,
   S. G. WELLS.